United States Patent [19]

Ehlers et al.

[11] Patent Number: 4,740,929

[45] Date of Patent: Apr. 26, 1988

[54] METHOD FOR SUPPRESSING NOISE IN SEISMIC DATA

[75] Inventors: Jerry W. Ehlers; Randol R. Read, both of Tulsa, Okla.

[73] Assignee: Amoco Corporation, Chicago, Ill.

[21] Appl. No.: 771,335

[22] Filed: Aug. 30, 1985

[51] Int. Cl.$^4$ ............................ G01V 1/00; G01V 1/28
[52] U.S. Cl. ........................................ 367/46; 367/45; 367/63
[58] Field of Search ........................ 367/38, 45, 46, 62; 364/421, 728

[56] References Cited

U.S. PATENT DOCUMENTS

| | | | |
|---|---|---|---|
| 3,195,676 | 7/1965 | Eisler et al. | 367/57 |
| 3,398,396 | 8/1968 | Embree | 367/46 |
| 3,924,260 | 12/1975 | Braham et al. | 367/67 |
| 4,210,968 | 7/1980 | Lindseth | 367/46 |
| 4,468,761 | 8/1984 | Rietsch | 367/43 |
| 4,561,074 | 12/1985 | Warmack | 367/46 |
| 4,561,075 | 12/1985 | Smith et al. | 367/46 |
| 4,598,392 | 7/1986 | Pann | 367/32 |

FOREIGN PATENT DOCUMENTS 1497885 12/1978 United Kingdom ................ 367/67

OTHER PUBLICATIONS

"Encyclopedic Dictionary for Exploration Geophysicits"; p. 146 and figure 124, Sheriff, R. E.; Jan. 1975.
"Estimation of the Signal to Noise Ratio of Seismic Data with an Application to Stacking", E. Rietsch, Geophysical Prospecting, 1980, pp. 531–550.
"A Comparison of Seismic Trace Summing Techniques" Gilman et al., Geophysics, vol. 45, No. 6, 1980, pp. 1017–1041.

Primary Examiner—Thomas H. Tarcza
Assistant Examiner—Tod R. Swann
Attorney, Agent, or Firm—Timothy D. Stanley

[57] ABSTRACT

A method for recursively, continuously estimating the noise and signal components of a seismic trace. More particularly, a method for suppressing the noise component in seismic data so as to enhance the resolution of seismic events contained therein. The signal component of each seismic trace is determined recursively from the preceding estimate of the signal component in each preceding seismic trace.

16 Claims, 6 Drawing Sheets

METHOD FOR SUPPRESSING NOISE IN SEISMIC DATA

BACKGROUND OF THE INVENTION

The present invention relates generally to a method for processing seismic data. More particularly, the present invention provides a method for recursively, continuously estimating the noise and signal components of seismic trace signals. Additionally, the present invention discloses a method for suppressing the noise component of a seismic trace signal so as to enhance the signal component thereof. A measure of the signal component of a first seismic trace signal is obtained. Recursively, a measure of the signal component of a second seismic trace signal is obtained employing the measure of the signal component of the first seismic trace signal.

Seismic exploration involves generating seismic waves at the surface of the earth by means of a seismic source. The seismic waves travel downwardly into the earth and are reflected and/or refracted due to differences in elastic properties at the interface of various subterranean formations. Detectors, called seismometers, or geophones, located along the surface of the earth and/or in a borehole, produce analog electric seismic signals or seismic trace signals in response to detected seismic wave reflections and/or refractions. The analog electric seismic signals or seismic trace signals from the seisomometers, or geophones, can then be recorded. Alternatively, the analog seismic signals or seismic trace signals from the seismometers, or geophones, can be sampled and digitized prior to being recorded. The seismic data recorded in either manner are subsequently processed and analyzed to determine the nature and structure of the subterranean formations.

In many seismic operations, low energy seismic sources, such as vibrators, are employed resulting in the signal component of a resulting seismic trace signal being low in amplitude compared to the noise component thereof. Low energy seismic sources, such as vibrators, generate a chirp signal of seismic energy. In the case of low energy seismic vibrators, the recorded seismic wave reflections and/or refractions can be cross-correlated with a replica (called the pilot signal) of the original chirp signal in order to reproduce recordings similar to those which would have been produced with a high energy seismic source. Unfortunately, the recorded seismic data always includes some unwanted noise in addition to the detected seismic waves reflected and/or refracted from the subterranean formations which noise can distort or even ruin the seismic data by obscuring seismic events related to the reflections and/or refractions from the subterranean formations. Noise is generally nonrecurring or not dependent upon the seismic vibrator. The noise appears in many forms, such as atmospheric electromagnetic disturbances, wind, motor vehicle traffic in the vicinity of the prospect area, recorder electrical noise, etc. When a high energy source is used, such a dynamite, the level of the detected seismic signal component is usually much greater than the noise component. In spite of the unfavorable relationship between the noise component and signal component of a seismic trace signal generated by a low energy seismic source, it has been determined that seismic trace signals having such poor signal-to-noise character can be combined or vertically stacked in such a fashion that the signal component will be reinforced while the noise component will tend to be cancelled out.

In the present invention, the resolution of seismic event in the signal component in a seismic trace signal can be favorably enhanced by recursively determining the noise component therein by estimating that the signal component of a second seismic trace signal is approximately equal to the signal component of a first seismic trace signal.

DETAILED DESCRIPTION OF THE PREFERRED EMBODIMENT

Figures 1, 2:
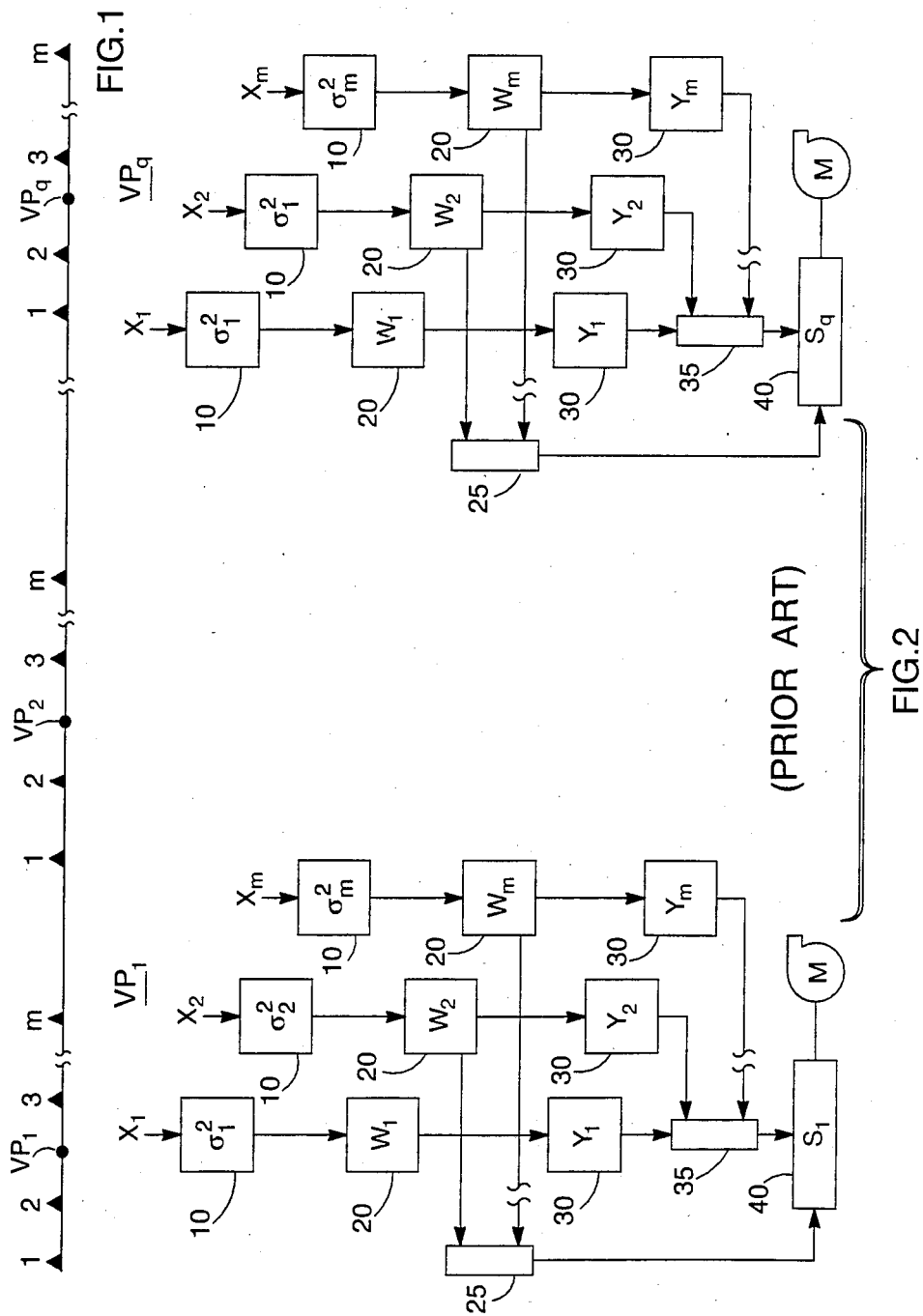
FIG. 1 is a typical seismic exploration vibrator layout.
FIG. 2 is a flow diagram illustrating the diversity stack method of Embree.

The following explanation is provided to be of assistance in understanding the operation of the present invention. The discussion is based upon the assumption that the signal component of each seismic trace signal is substantially constant in both phase and amplitude from vibration point to vibration point. Generally, with low energy seismic sources, such as vibrators, employing the same chirp signal, this is a good assumption. However, in certain geological settings, the movement of the vibrator from one vibration point to another can cause variations in the phase and amplitude of the signal component of a seismic trace signal. Generally, variations in either phase or amplitude of the signal component of less than 10% do not seriously degrade the capability of one embodiment of the present invention. Moreover, variations of greater than 10% in the phase of the signal component have no substantially adverse effect on another embodiment of the present invention.

The following explanation addresses the general case assuming that there can be varying amounts of noise component between successive vibrator initiations or sweeps in which seismic energy is imparted into the earth's subterranean formations by the vibrator.

The seismic trace signal $X_m(t)$ is comprised of a signal component and a noise component according to:

$$X_m(t) = S(t) + N_m(t) \tag{1}$$

where $S(t)$ = the signal component of the seismic trace signal representative of the earth's response to seismic energy imparted therein; and $N_m(t)$ = the noise component of the m-th seismic trace signal generated during the acquisition of the seismic data $X_m(t)$.

Since it has been assumed that the signal component is substantially uniform from sweep to sweep, the subscript m indicating different vibrator initiations or sweeps has been dropped.

A substantial effort has been undertaken in the area of seismic exploration employing low energy vibrators to develop better processing techniques to estimate the signal component of the seismic trace signal to better resolve the reflection and/or refraction seismic events contained therein. The maximum likelihood estimation technique disclosed by Fisher, "On the Mathematical Foundation of Theoretical Statistics: Philosophical Transactions of the Royal Society of London," vol. 222, p. 309 (1922) provided an ideal theoretical basis for such processing techniques. The maximum likelihood estimation technique leads to the determination of the minimum variance signal estimation equations. A signal component, $S(t)$, can be calculated from the input seismic trace signal, $X_m(t)$, using Eqs. 2 and 3 below. The noise component variance, $\sigma_m^2$, can be calculated from Eq. 4 below and then used in Eq. 3.

$$S(t) = \frac{\sum\limits_{m} w_m X_m(t)}{\sum\limits_{m} w_m} \quad (2)$$

$$w_m = 1/\sigma_m^2 \quad (3)$$

$$\sigma_m^2 = \sum\limits_{t} [X_m(t) - S(t)]^2 \quad (4)$$

where
$S(t)$ = the normalized, stacked desired signal component of the seismic trace signal;
$X_m(t)$ = is the m-th input seismic trace signal;
$\sigma_m^2$ = variance of the noise component; and
$w_m$ = the signal component weighting factor.
$(t)$ = time domain However, there is no unique solution to these coupled Equations (2–4) explicitly. As such, the maximum likelihood estimation method attempts to find the solution which maximizes an assumed conditional probability density function of the input seismic trace signal. There are two major difficulties, however, in implementing such method in a field recording system such as described by Broding, et al., in U.S. Pat. No. 3,386,864. First, such method requires an excessive amount of memory to simultaneously store each individual seismic trace to be processed. Secondly, the processing demands for simultaneously solving such multiple equations are beyond the capability for real time multichannel microprocessors employed in field recording systems such as Broding's.

A first attempt to overcome certain of these difficulties was developed by Embree, U.S. Pat. No. 3,398,396, and hereafter referred to as diversity stack, which makes the assumption that the signal component of the seismic trace signal is much smaller than the noise component of the seismic trace signal. With that assumption, the signal component can be more simply calculated from Eqs. 2 and 3 since the signal component $S(t)$ can be dropped from Eq. 4 resulting in Eq. 5.

$$\sigma_m^2 = \sum\limits_{t} X_m^2(t) \quad (5)$$

FIG. 1 is a typical layout of vibrator vibration points $VP_1, VP_2, \ldots VP_q$ for seismic exploration. Positioned incrementally about each vibration point are vibrator initiation or sweep points $1, 2, \ldots, m$. Hereafter, the subscripts q and m can generally indicate either a variable vibration point and sweep respectively or the last vibration point in a set of q vibration points and the last sweep in a series of m sweeps respectively. Each sweep point m associated with a vibration point can either coincide identically with the vibration point or can be spaced incrementally about the vibration point as shown in FIG. 1. Either configuration is understood to be included in the language contained hereafter. Each vibrator initiation or sweep associated with a vibration point results in a seismic trace signal $X_m(t)$ being generated by a geophone (not shown). Each of the resulting seismic trace signals $X_m(t)$ for a given vibration point $VP_q$ can be weighted and vertically summed to form a normalized, stacked signal component record $S_q(t)$ for each vibration point $VP_q$.

Looking next to FIG. 2, a flow diagram of the diversity stack technique as disclosed by Embree is shown. FIG. 2 clearly demonstrates that for each input seismic trace signal, $X_m(t)$ at a selected vibration point $VP_q$, a series of independent calculations of the weighted signal component $Y_m(t)$ in each seismic trace signal are performed. Specifically, a noise variance $\sigma_1^2$ for a first vibrator initiation or sweep at a first vibration point $VP_1$ is determined in block 10 according to Eq. (5) for seismic trace signal $X_1(t)$. A weighting factor $w_1$ is determined in block 20 for the first vibrator sweep at the first vibration point $VP_1$ according to Eq. (3). A weighted signal component $Y_1(t)$ for the first vibrator sweep at the first vibrator point $VP_1$ is determined in block 30 according to Eq. (6) below.

$$Y_m(t) = w_m X_m(t) \quad (6)$$

For subsequent sweeps (up to m) at the first vibration point $VP_1$, the resulting seismic trace signals $X_m(t)$ are similarly processed in corresponding blocks 10, 20, and 30. Additionally, a summer 25 continuously sums the weighting factors $w_m$ and a summer 35 continuously sums the weighted signal components $Y_m(t)$. Using the outputs of summers 25 and 35, a normalized, stacked signal component record $S_q(t)$ is obtained according to Eq. (7) in block 40 after the last vibrator sweep. The above process is repeated for each vibration point $VP_q$ as shown on the right side of FIG. 2 in corresponding blocks 10, 20, 25, 30, 35, and 40. The normalized, stacked signal component record $S_q(t)$ at each vibration point can then be transferred to a storage medium M such as magnetic tape or the like.

$$S_q(t) = \frac{Y_1 + Y_2 + \ldots + Y_m}{w_1 + w_2 + \ldots + w_m} = \frac{\sum\limits_{m} w_m X_m(t)}{\sum\limits_{m} w_m} \quad (7)$$

The diversity stack technique does not benefit from the knowledge of the seismic environment obtained from the calculation of the estimated signal component of prior stacked records and seismic trace signals. Rather, in each instance the noise variance of the signal component, $v_m^2$, is calculated assuming that no knowledge exists of the preceding estimate of the signal component or the seismic noise environment.

Figure 3:
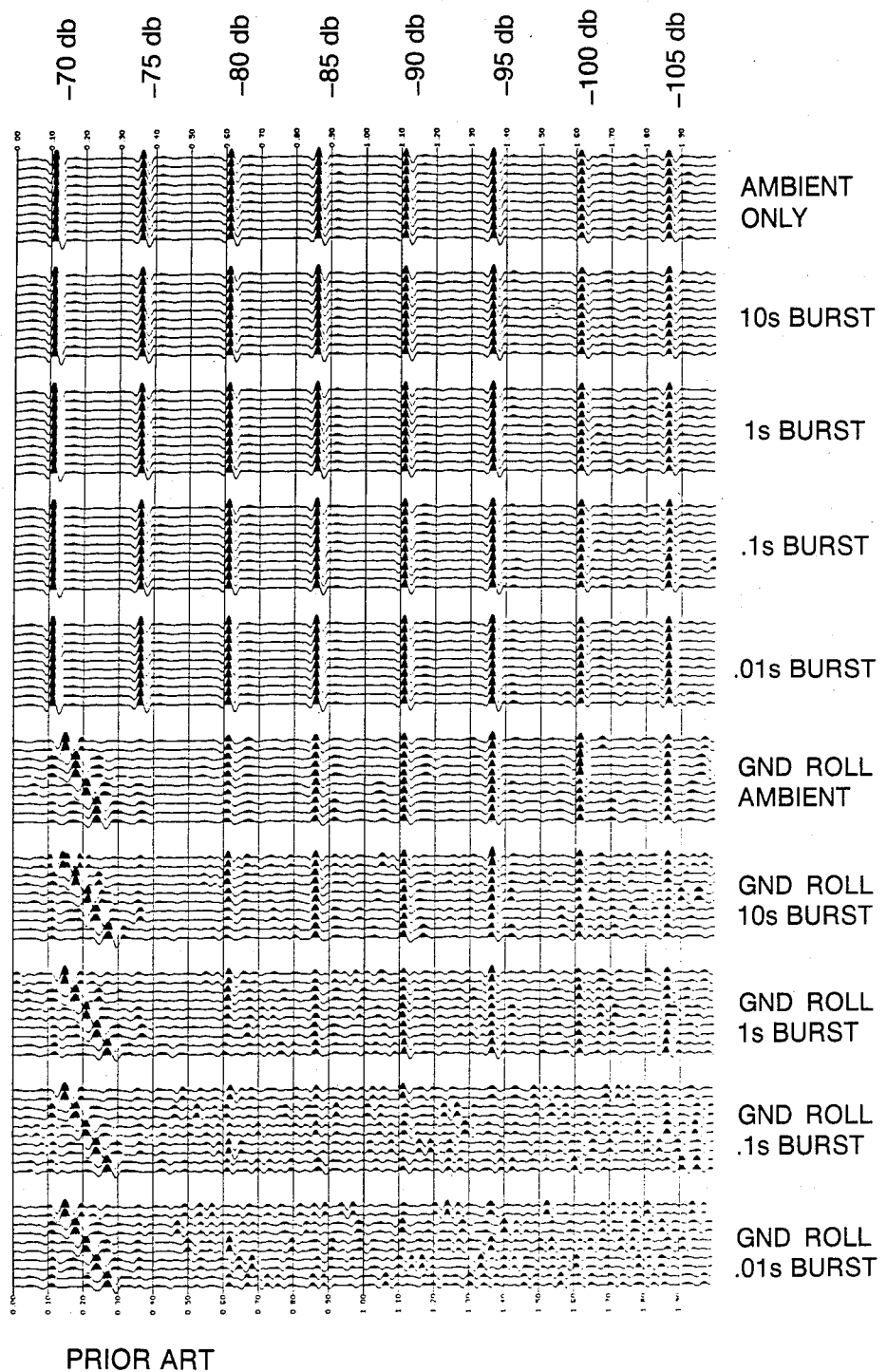
FIG. 3 are synthetic seismic trace signals, with various noise components, processed according to FIG. 2.

FIG. 3 comprises synthetic seismic trace signals, with various noise components, processed according to the diversity stack method described above. The diversity stack method has the advantage of being able to perform the summations and to process the data on a sequential, real time basis. While the diversity stack method does a good job of reducing time varying noise components, it tends to degrade the normalized, stacked signal component record when the signal component is not below the noise component level. This can be the case much of the time with the noise component associated with ground roll. If the low energy seismic vibrators remain stationary during a sequence of vibrator initiations or sweeps, then ground roll will behave as a large amplitude signal component which is not below noise component levels but can change significantly from vibrator initiations. If the low energy seismic vibrators move incrementally about the vibration point after each vibrator initiation, then the ground roll will behave as noise directly correlated with the signal component and not as random noise. In either case, the primary assumptions made for the diversity stack method are violated.

Figure 4:
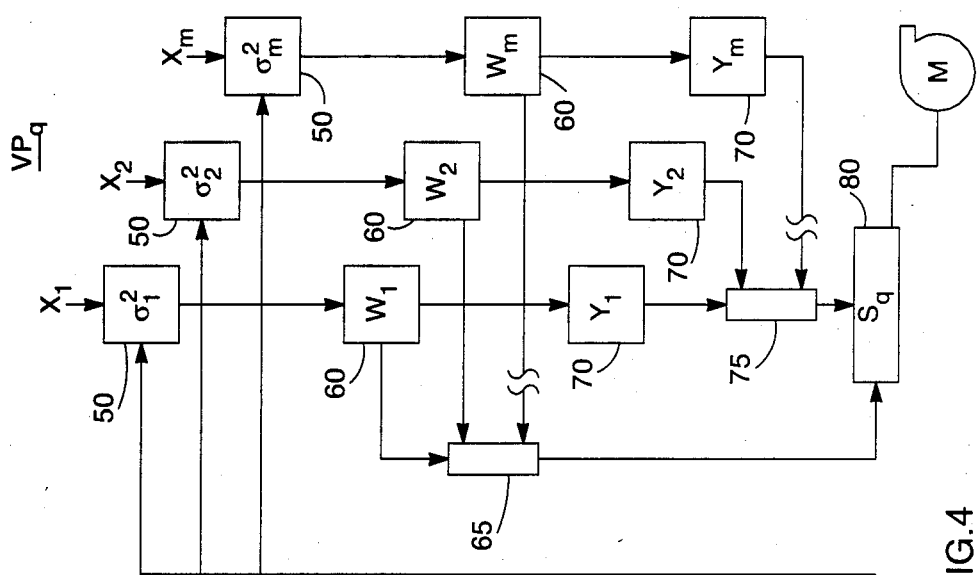
FIG. 4 is a flow diagram illustrating a first embodiment of the present invention.
Figure 4:
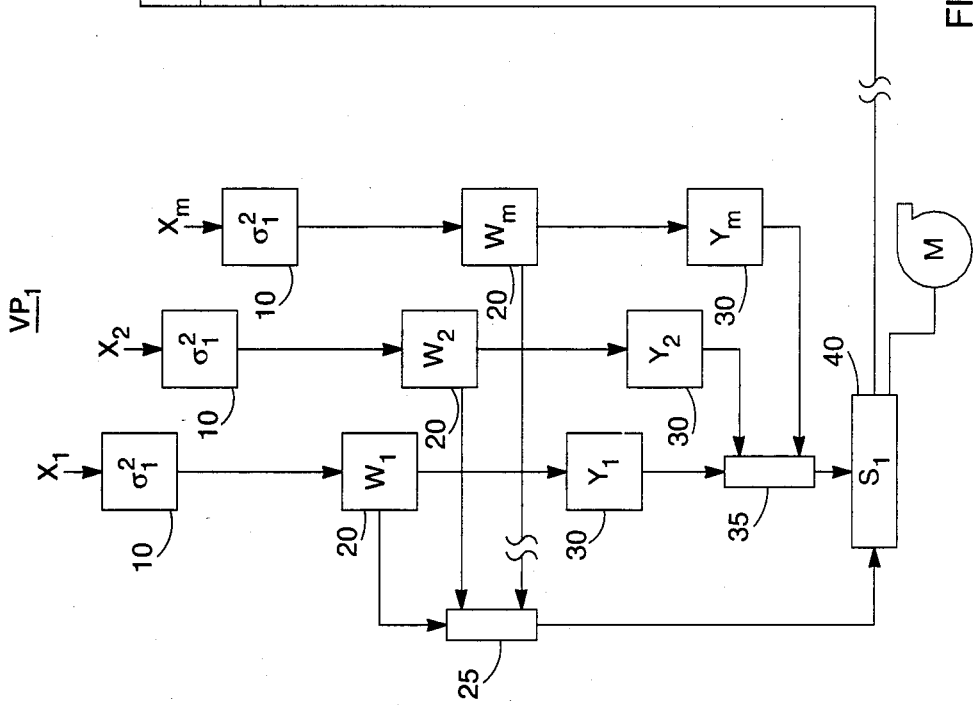

In order to obtain a method for better suppressing the noise component of a seismic trace signal in view of the various noise components which may be encountered, the present invention has been developed. Referring now to FIG. 4, a first embodiment of the present invention is shown. A measure of the estimated signal component for the seismic trace signals generated at a first vibration point $VP_1$ is shown in Blocks 10, 20, 25, 30, 35 and 40 of FIG. 4, and corresponds to the technique used repeatedly with diversity stack method. However, starting with the seismic trace signals generated at the second vibration point $VP_2$ and subsequent vibration points $VP_q$, it will be shown that the estimated signal component of subsequent vibration points is recursively determined by modifying the maximum likelihood equations according to Eqs. 8, 9, and 10 below.

Specifically, in estimating the signal component of seismic trace signals at subsequent vibration points, $VP_q(q>1)$, a noise variance $\sigma_1^2$, for the first vibrator sweep at vibration point $VP_q(q>1)$, is determined in block 50 according to Eq. (10). The normalized, stacked signal component record $S_{(q-1)}(t)$ from the preceding vibration point $VP_{(q-1)}$ is used as an estimate of the signal component contained within seismic trace signals obtained at the current vibration point $VP_q(q>1)$. A weighting factor $w_1$ for the first vibrator sweep at vibration point $VP_q(q>1)$ is determined in block 60 according to Eq. (9). A weighted signal component $Y_1(t)$ for the first vibrator sweep at vibration point $VP_q(q>1)$ is determined in block 70 according to Eq. (8). For subsequent vibrator sweeps (up to m) at vibration points $VP_q(q>1)$ the resulting seismic trace signals $X_m(t)$ are similarly processed in corresponding blocks 50, 60, and 70. Additionally, a summer 65 continuously sums the weighting factors $w_m$ and a summer 75 continuously sums the weighted signal components $Y_m(t)$. Using the outputs of summers 65 and 75, a normalized, stacked signal component record $S_q(t)$ is obtained according to Eq. (7) in block 80 after the last vibrator sweep at each vibration point. The normalized, stacked signal component record $S_q(t)$ for each vibration point can then be transferred to a storage medium M such as magnetic tape or the like.

$$Y_m(t) = w_m X_m(t) \tag{8}$$

$$w_m = 1/\sigma_m^2 \tag{9}$$

$$\sigma_m^2 = \sum_t [X_m(t) - S_{(q-1)}(t)]^2 \tag{10}$$

where $Y_m(t)$ = the weighted signal component for the m-th initiation of the vibrator;

$X_m(t)$ = the input seismic trace data of the m-th initiation of the vibrator;

$\sigma_m^2$ = the estimated variance of the noise component for the m-th initiation of the vibrator;

$w_m$ = signal weighting for the m-th initiation of the vibrator; and $S_q(t)$ = the q-th normalized, stacked signal component record at the q-th vibration point.

(t) = time domain

Figure 5:
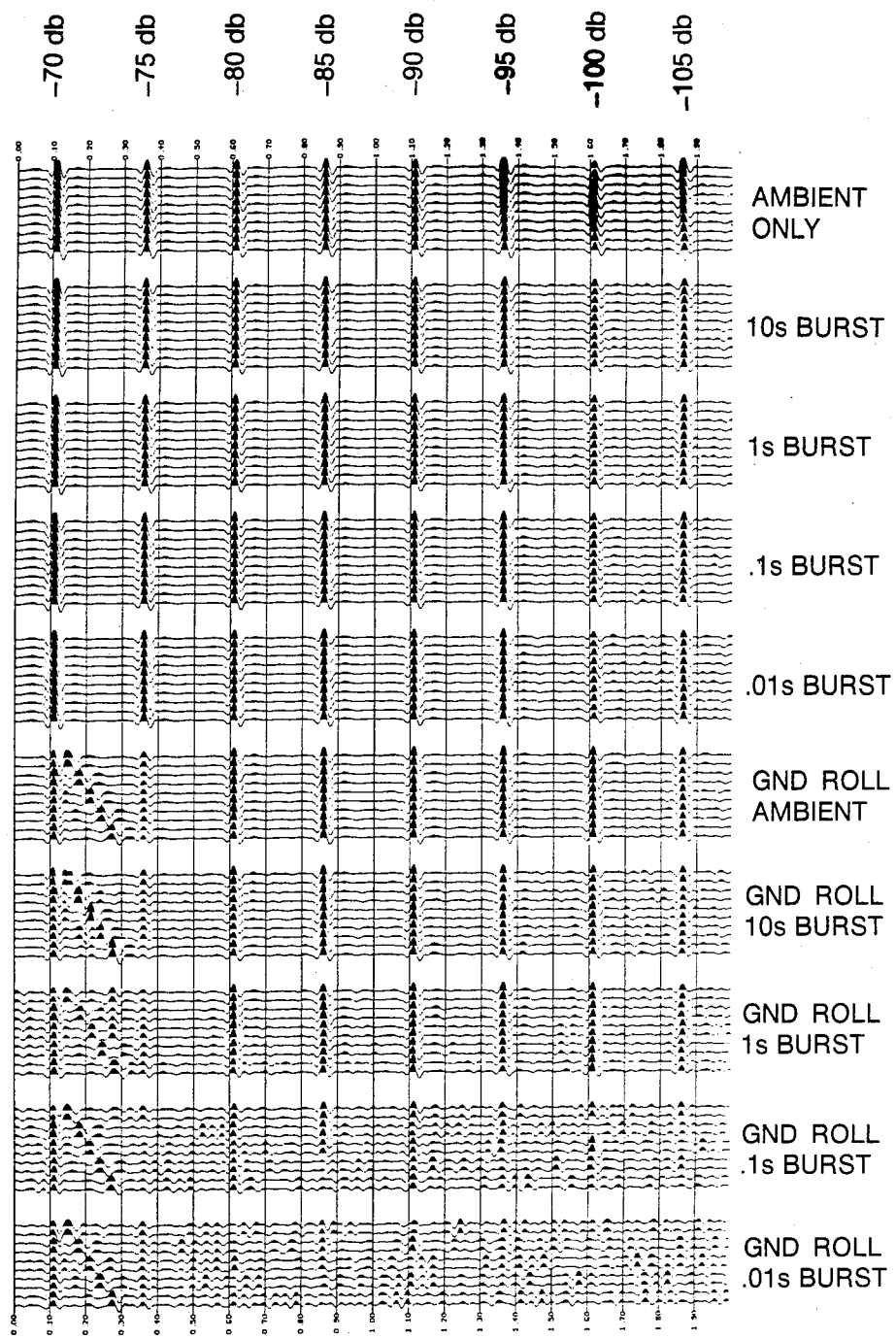
FIG. 5 are synthetic seismic trace signals, with various noise components, processed according to FIG. 4.

This approach provides a recursive, continuous estimate of both the noise component and the signal component of the seismic trace signals with each normalized, stacked signal component record. FIG. 5 comprises synthetic seismic trace signals for various noise components processed according to the first embodiment of the present invention.

As can be seen from FIG. 4, however, technique requires approximately twice the memory capacity of the diversity stack method because both the previous summation of the weighted seismic trace signals, i.e., signal component estimates, must be maintained as well as the current weighted signal component. In a digitized version, the weighting factor can be determined over discrete windows and thus can require much less memory than the signal components.

Figure 6:
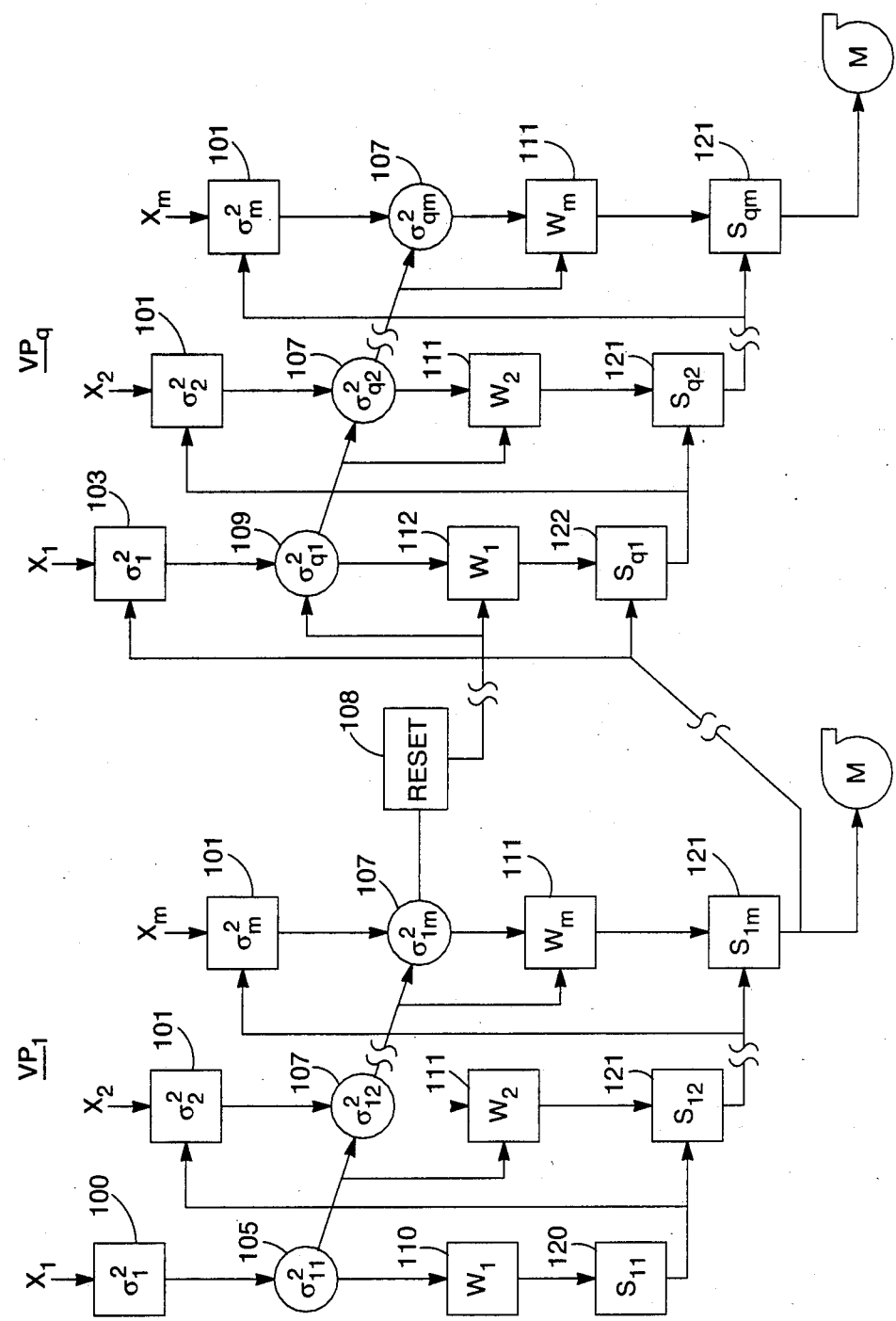
FIG. 6 is a flow diagram illustrating a second embodiment of the present invention.

A second embodiment of the present invention is shown in FIG. 6 which utilizes the recursive estimate of the noise components and signal components of the seismic trace signals. Additionally, a running or continuous summation of the normalized, stacked signal component record is provided after each vibrator initiation or sweep.

Specifically, a noise variance $\sigma_1^2$ is determined in block 100 according to Eq. (5) for a first vibrator sweep at a first vibration point $VP_1$ from resulting seismic trace signal $X_1(t)$. For the first vibrator initiation or sweep at vibration point $VP_1$ the weighting factor $w_1$ is set equal to 1 in block 110 and a first estimate of the normalized, stacked signal component record $S_{11}(t)$ is obtained in block 120 according to Eq. (2). Hereafter, the double subscripts are indicative of vibration point q and sweep m respectively. Additionally, the noise variance as determined in block 100 for the first vibrator point is redefined as the updated noise variance $\nu_{11}^2$ in block 105.

For the remaining vibrator sweeps (m>1) at vibration point $VP_1$, a noise variance $\sigma_m^2$ is determined in block 101 for the resulting seismic trace signals $X_m(t)$ (m>1) employing the normalized, stacked signal component record $S_{1(m-1)}(t)$ determined from the preceding vibrator sweep according to Eq. 11.

$$\sigma_m^2 = \sum_t [X_m(t) - S_{q(m-1)}(t)]^2 \tag{11}$$

(t) = time domain

The noise variance $\sigma_m^2$ determined in Block 101 is used to calculate the updated noise variance $\sigma_{qm}^2$ in Block 107. according to Eq. (12).

$$\sigma_{qm}^2 = \cfrac{1}{\cfrac{1}{\sigma_{q(m-1)}^2} + \cfrac{1}{\sigma_m^2}} \tag{12}$$

where $\sigma_m^2$ = the noise variance calculated for the m-th sweep in block 101; and $\sigma_{q(m-1)}^2$ = the updated noise variance at the q-th vibration point and the (m−1)-th sweep.

A weighting factor $w_m$ (m>1) is determined in block 111 according to Eq. (13) below.

$$w_1 = \frac{\sigma_{q(m-1)}^2}{\sigma_{q(m-1)}^2 + \sigma_m^2} \tag{13}$$

where $\sigma_q^2(m-1)$=the updated noise variance for the q-th vibration point and the (m−1)-th vibrator sweep;

$\sigma_m^2$=the noise variance of the m-th vibrator sweep determined in block 101 of FIG. 6.

A normalized, stacked signal component $S_{qm}(t)$ is determined in block 121 according to Eq. (14) below for the remaining vibrator sweeps (m>1) at vibration point $VP_q$ (q=1). The normalized, stacked signal component record for the last sweep m at vibration point q=1 can then be transferred to a storage medium M such as magnetic tape or the like.

$$S_{qm}(t) = S_{q(m-1)}(t) + w_m[X_m(t) - S_{q(m-1)}(t)] \tag{14}$$

The updated noise variance $v_{qm}^2$, after the last sweep at any vibration point, can be reset in block 108, e.g., $\sigma_{qm}^2 = \sigma_m^2$ where $\sigma_m^2$ is the noise variance calculated in block 101 according to Eq. (11) for the last sweep at a given vibration point.

For subsequent vibration points $VP_q$(q>1) and first vibrator sweeps (m=1), the noise variance $\sigma_m^2$ is determined in block 103 according to Eq. (15) below:

$$\sigma_m^2 = \sum_t [X_1(t) - S_{(q-1)m}(t)]^2 \tag{15}$$

where $X_1(t)$=the seismic trace signal for the first vibrator sweep at vibration point $VP_q$ $S_{(q-1)m}(t)$=the stacked record of the preceding vibration point $VP_{(q-1)}$ and the m-th vibrator sweep (t)=time domain.

The noise variance $\sigma_m^2$ determined in block 103 is used to calculate the updated noise variance in block 109 according to Eq. (12) except that the updated noise variance $\sigma_{q(m-1)}^2$ can be reset to the value of the noise variance $\sigma_m^2$ determined in block 108 from the last sweep of the previous vibration point.

The weighting factor $w_1$ for the first vibrator sweep at each vibrator point $VP_q$(q>1) is determined in to block 112, according to Eq. (16).

$$w_1 = \frac{\sigma_{(q-1)m}^2}{\sigma_{(q-1)m}^2 + \sigma_1^2} \tag{16}$$

where $\sigma_1^2$=the noise variance determined in block 103; and $\sigma_{(q-1)m}^2$=the noise variance for the m-th vibrator sweep of the preceding vibration point $VP_{(q-1)}$.

A first estimate of the signal component of the normalized, stacked signal component record $S_{q1}(t)$ is obtained in block 122 according to Eq. (17) below.

$$S_{qm}(t) = S_{(q-1)m}(t) + w_1[X_1(t) - S_{(q-1)m}(t)] \tag{17}$$

For the remaining vibrator sweeps (m>1) at vibration point $VP_q$, (q>1) a noise variance $\sigma_m^2$ is determined in block 101 from the resulting seismic trace signals $X_m(t)$ (m>1) and the normalized, stacked signal component record $S_{q(m2-1)}(t)$, according to Eq. (10). An updated noise variance $\sigma_{qm}^2$(m>1) defined in block 107. A weighting factor $w_m$(m>1) is determined in block 111 according to Eq. (11). A normalized and stacked signal component record $S_{qm}(t)$ is determined in block 121 according to Eq. (11) for the remaining vibrator sweeps (m>1) at vibration point $VP_q$.

In the second embodiment of the present invention, by the expedient of recursively determining signal components of second and subsequent siesmic trace signals as a function of the signal component of the first or a preceding seismic trace signal, the memory capacity required to implement the second embodiment of the present invention can be approximately ½ of that required of the first embodiment. The recursive, continuous estimate of the signal component and the continuous summation of signal components to form a normalized and stacked signal component record is not without its limitations.

The technique of the second embodiment assumes that both the amplitude and phase relationship in the signal components do not vary by more than 10% from vibration point to vibration point. However, in a limited number of geological settings it has been noted that in moving the seismic vibrator incrementally about a vibration point one can generate differences in phase and/or amplitude in the signal components greater than 10% due to the inhomogeneity of the earth or variation in the seismic source-receiver spacing. In such situations, utilization of the first embodiment of the invention is preferred or a reinitialization of the process can be selected.

Figure 7:
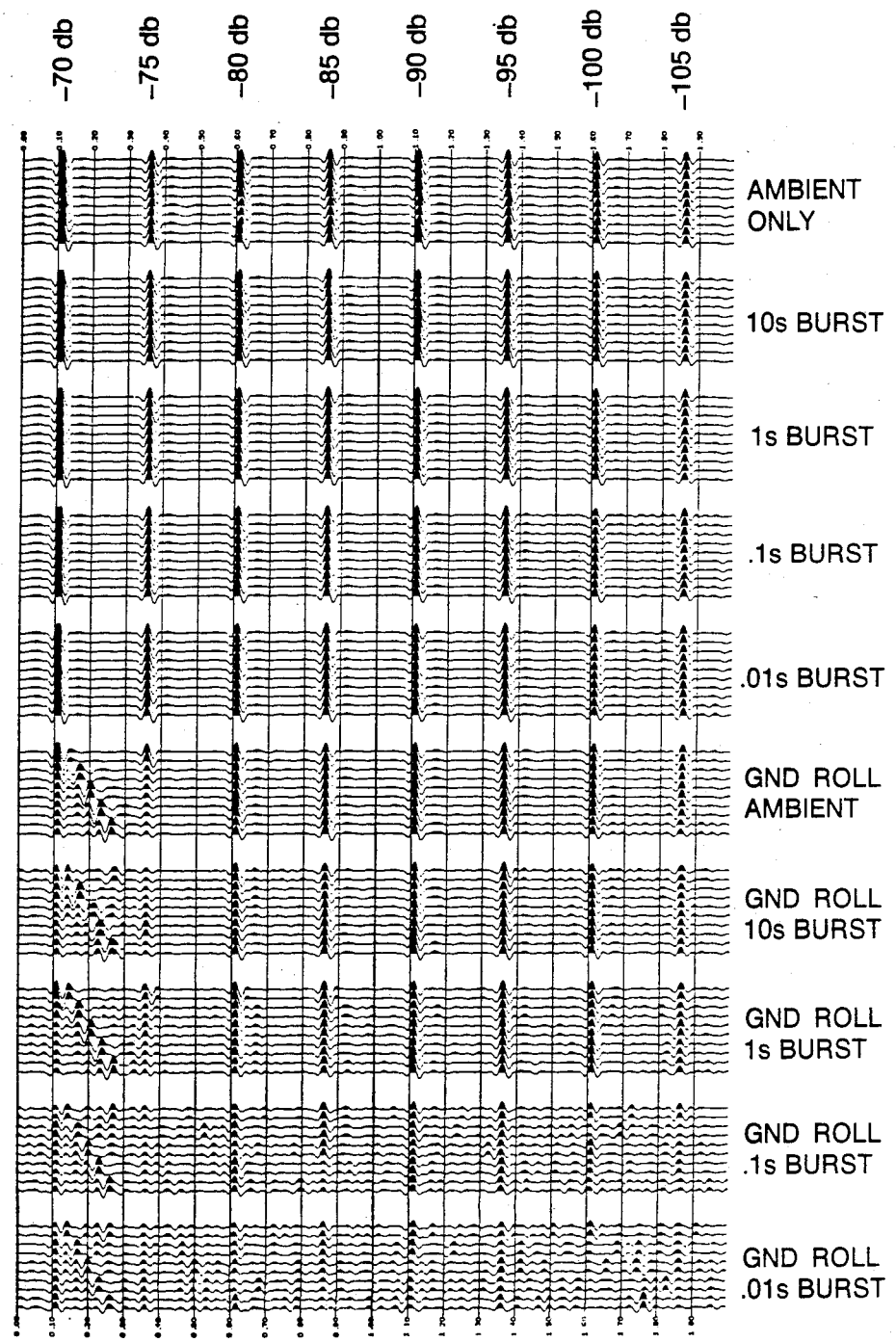
FIG. 7 are synthetic seismic trace signals, with various noise components, processed according to FIG. 6.

FIG. 7 is a representation of the capability of the second embodiment of the present invention to deal with the varying noise environments as confronted by both diversity stack method and the first method of the present invention. The first and second embodiment of the present invention clearly demonstrate a capability to suppress noise, especially ground roll in seismic trace signals and to enhance the resolution of seismic events contained in the seismic signal component thereof.

The method of the present invention more closely approximates the potential performance sought by the maximum likelihood estimation technique. Here, the signal component estimate from each preceding vibration point is used in calculating the noise component variance in the subsequent seismic trace.

The first embodiment of the present invention uses the signal component estimate in a continuous manner from vibrator point to vibrator point in estimating the variance of the noise component to provide improved updates to the signal component. However, this technique requires keeping in memory both the signal component estimates from the previous seismic record as well as the ongoing partial summations for the new signal component estimates. By adaptation of the first method, a single memory process has been developed in the second embodiment of the present invention. As seen, instead of building the process around a partial unnormalized sum, the process truly estimates the normalized signal on a continuous basis, thus requiring only a single stacking memory. The normalized signal estimate is always present in the memory either to be written to tape or used in estimating the variance of the noise component. Both methods require an additional small amount of memory for summed weights or variance estimates on a windowed basis.

Having described the invention in connection with certain specific embodiments thereof, and in view of the specification and figures presented, it is to be understood that further modifications, such as implementing the present invention with digitized seismic trace signals, may now suggest themselves to those skilled in the art and is intended to cover such modifications that fall within the scope of the attached claims.

What is claimed is:

1. A method for suppressing noise in seismic data so to provide enhanced resolution of seismic events comprising the steps of:
    (a) obtaining a first set of seismic trace signals representative of the earth's response to seismic energy imparted at a plurality of sweep points about a first vibration point, wherein each seismic trace signal trace comprises a noise component and a signal component;
    (b) determining a measure of the signal component in the first set of seismic trace signals;
    (c) obtaining a second set of seismic trace signals representative of the earth's response to additional seismic energy imparted at a plurality of sweep points about a second vibration point, wherein each seismic trace signal comprises a noise component and a signal component; and
    (d) recursively determining a measure of the signal component in the second set of seismic trace signals employing the measure of the signal component for the first set of seismic trace signals.

2. The method of claim 1 wherein the step of determining the measure of the signal component in the first set of seismic trace signals includes:
    (a) determining a measure of the noise variance in each seismic trace signal in the first set of seismic trace signals;
    (b) weighting each seismic trace signal of the first set of seismic trace signals with the measure of the noise variance therein to form a weighted signal component for each seismic trace signal of the first set of seismic trace signals; and
    (c) summing the weighted signal components for each seismic trace signal in the first set of seismic trace signals to form the measure the signal component in the first set of seismic trace signals.

3. The method of claim 2 wherein the step of recursively determining the measure of the signal component in the second set of seismic trace signals includes:
    (a) recursively determining a measure of the noise variance in each seismic trace signal in the second set of seismic trace signals employing the measure of the signal component in the first set of seismic trace signals;
    (b) weighting each seismic trace signal of the second set of seismic trace signals with the measure of the noise variance therein to form a weighted signal component for each seismic trace signal of the second set of seismic trace signals; and
    (c) summing the weighted signal components for each seismic trace signal of the second set of seismic trace signals to form the measure of the signal component in the second set of seismic trace signals.

4. The method of claim 1 wherein the step of determining the measure of the signal component for the first set of seismic trace signal comprises:
    (a) determining a measure of the noise component in each seismic trace signal of the first set of seismic trace signals;
    (b) weighting each seismic trace signal of the first set of seismic trace signals with the measure of the noise component therein; and
    (c) summing the weighted seismic trace signals of the first set of seismic trace signals to form the measure of the signal component in the first set of seismic trace signals.

5. The method of claim 4 wherein the step of recursively determining the measure of the signal component of the second set of seismic trace signal comprises:
    (a) recursively determining a measure of the noise component in each seismic trace signal of the second set of seismic trace signals employing the measure of the noise component in the first set of seismic trace signals;
    (b) weighting each seismic trace signal of the second set of seismic trace signals with the measure of the noise component therein; and
    (c) summing the weighted seismic trace signals of the second set of seismic trace signals to form the measure of the signal component in the second set of seismic trace signals.

6. The method of claim 1 wherein the step of determining a measure of the signal component of the first set of seismic trace signals comprises:
    (a) determining a measure of the noise variance for each seismic trace signal in the first set of seismic trace signals according to:

$$\sigma_m^2 = \sum_t X_m^2(t)$$

where
    $X_m(t)$ = seismic trace signals of the first set of seismic trace signals;
    t = time domain;
    (b) weighting each seismic trace signal of the first set with the measure of the noise variance therein to form a weighted signal component for each seismic trace signal of the first set according to:

$$Y_m(t) = w_m X_m(t)$$

where $w_m$ = weighting factor;
    (c) summing the weighted signal component for each seismic trace signal of the first set of seismic trace signals to form a normalized, stacked signal component for the first set of seismic trace signals according to:

$$S_1(t) = \frac{Y_1 + Y_2 + \ldots + Y_m}{w_1 + w_2 + \ldots + w_m}.$$

7. The method of claim 6 wherein the step of recursively determining the measure of the signal component in the second set of seismic trace signal includes:
    (a) recursively determining a measure of the noise variance for each seismic trace signal of the second set of seismic trace signals employing the measure of the signal component in the first set of seismic trace signals according to:

$$\sigma_m^2 = \sum_t [X_m(t) - S_1(t)]^2$$

(b) weighting each seismic trace signal of the second set of seismic trace signals with the measure of the noise variance therein to form a weighted signal component for each seismic trace signal of the second set of seismic trace signals according to:

$$Y_m(t) = w_m X_m(t)$$

(c) summing the weighted signal component for each seismic trace signal of the second set of seismic trace signals to form a normalized, stacked signal component for the second set of seismic trace signal according to:

$$S_2(t) = \frac{Y_1 + Y_2 + \ldots + Y_m}{w_1 + w_2 + \ldots + w_m}.$$

8. A method for suppressing the noise component in seismic data so as to enhance the resolution of seismic events comprising the steps of:
(a) obtaining a first set of seismic trace signals representative of the earth's response to seismic energy imparted at a plurality of sweep points about a first vibration point, wherein each seismic trace signal comprises a noise component and a signal component;
(b) determining a measure of the noise component in each seismic trace signal of the first set of seismic trace signals;
(c) determining a measure of the signal component in the first set of seismic trace signals employing the measure of the noise component contained therein;
(d) obtaining a second set of seismic trace signals representative of the earth's response to seismic energy imparted at a plurality of sweep points about a second vibration point; wherein each seismic trace signal comprises a noise component and a signal component;
(e) determining a measure of the noise component in each seismic trace signal of the second set of seismic trace signals employing the signal component of the first set of seismic trace signals; and
(f) determining a measure of the signal component in the second set of seismic trace signals employing the measure of the noise component contained therein.

9. The method of claim 8 wherein steps (b) and (c) include:
determining the measure of the noise component in each seismic trace of the first set of seismic trace signals according to:

$$\sigma_m^2 = \sum_t X_m^2(t)$$

where
$X_m(t)$ = seismic trace signals in the first set of seismic trace signals;
t = time domain; and
determining the measure of the signal component in the first set of seismic trace signals employing the measure of the noise component contained therein according to:

$$S_1(t) = \frac{\sum_m w_m X_m(t)}{\sum_m w_m}$$

where $w_m = 1/\sigma_m^2$ for the first set of seismic trace signals.

10. The method of claim 9 wherein steps (e) and (f) includes:
determining the measure of the noise component in each seismic trace signals of the second set of seismic trace signals employing the measure of the signal component in the first set of seismic trace signals according to:

$$\sigma_m^2 = \sum_t [X_m(t) - S_1(t)]^2$$

where
$X_m(t)$ = seismic trace signals in the second set of seismic trace signals; and
$S_1(t)$ = the measure of the signal component in the first set of seismic trace signals; and
determining the measure of the signal component in the second set of seismic trace signals employing the measure of the noise component contained therein according to:

$$S_2(t) = \frac{\sum_m w_m X_m(t)}{\sum_m w_m}$$

where
$w_m = 1/\sigma_m^2$ for the second set of seismic trace signals.

11. A method for suppressing noise in seismic data so as to provide enhanced resolution of seismic events comprising the steps of:
(a) obtaining a first seismic trace representative of the earth's response to seismic energy imparted at a first sweep point about a first vibration point, wherein the first seismic trace includes a noise component and a signal component;
(b) determining a measure of variance of the noise component in the first seismic trace;
(c) determining a measure of the signal component in the first seismic trace employing the measure of variance of the noise component therein;
(d) obtaining a second seismic trace representative of the earth's response to additional seismic energy imparted at a second sweep point about the first vibration point, wherein the second seismic trace includes a noise component and a signal component;
(e) determining a measure of variance of the noise component in the second seismic trace employing the measure of signal components from the first seismic trace; and
(f) determining a measure of signal components in the second seismic trace employing the measure of signal component in the first seismic trace and the measure of variance of the noise component of the second seismic trace.

12. The method of claim 11 wherein steps (c), (e) and (f) include:
determining the measure of the signal component in the first seismic trace according to:

$$S_1(t) = w_1 X_1(t)$$

where
$X_1(t)$ = the first seismic trace;
$w_1$ = a weighting factor;
determining the measure of variance of the noise component in the second seismic trace employing the measure of the signal component in the first seismic trace according to:

$$\sigma_2{}^2 = \sum_t [X_2(t) - S_1(t)]^2$$

where
$X_2(t)$ = the second seismic trace;
$t$ = time domain; and
determining the measure of the signal component in the second seismic trace employing the measure of signal component in the first seismic trace and the measure of variance of the noise component in the second seismic trace according to:

$$S_2(t) = S_1(t) + w_2[X_2(t) - S_1(t)]$$

where $$w_2 = \frac{\sigma_{11}^2}{\sigma_{11}^2 + \sigma_2{}^2}$$

$$\sigma_{11}^2 = \sigma_1{}^2$$

$$\sigma_1{}^2 = \sum_t X_1{}^2(t).$$

13. The method of claim 12 further including the steps of:
(a) obtaining a third seismic trace representative of the earth's response to seismic energy imparted therein, wherein the third seismic trace includes a noise component and a signal component;
(b) determining a measure of variance of the noise component in the third seismic trace employing the measure of the signal component in the second seismic trace according to:

$$\sigma_3{}^2 = \sum_t [X_3(t) - S_2(t)]^2$$

where $X_3(t)$ = the third seismic trace; and
(c) determining a measure of the signal component in the third seismic trace employing the measure of the signal component in the second seismic trace and the measure of variance of the noise component in the third seismic trace according to:

$$S_3(t) = S_2(t) + w_3[X_3(t) - S_2(t)]$$

where $$w_3 = \frac{\sigma_{12}^2}{\sigma_{12}^2 + \sigma_3{}^2}$$

-continued $$\sigma_{12}^2 = \frac{1}{\frac{1}{\sigma_{11}^2} + \frac{1}{\sigma_3{}^2}}$$

14. A method for forming a first stacked seismic record from at least two seismic traces at a vibration point representative of the earth's response to seismic energy imparted therein, wherein each seismic trace comprises a noise component and a signal component including the steps of:
(a) determining a measure of the signal component in a first seismic trace;
(b) determining a measure of the noise component in a second seismic trace employing the measure of the signal component in the first seismic trace; and
(c) summing the measure of the signal components in the first seismic trace and in the second trace to form a stacked seismic record.

15. A method for forming a continuous measure of the signal component for a set of seismic trace signals for a vibration point wherein each seismic trace signal is representative of the earth's response to seismic energy imparted therein and each seismic trace comprises a signal component and a noise component, comprising the steps of:
(a) determining a measure of the signal component in a first seismic trace signal for a first vibration point;
(b) recursively determining a measure of the noise component in a second seismic trace signal of the first vibration point employing the measure of signal component in the first seismic trace signal of the first vibration point; and
(c) summing the measure of the signal component in the first seismic trace with the measure of the noise component in the second seismic trace to form a normalized, stacked signal component for the first vibration point.

16. The method of claim 15 further including the steps of:
(a) recursively determining a measure of the signal component in a first seismic trace signal for a second vibration point employing the measure of the signal component in the second seismic trace signal for the first vibration point;
(b) recursively determining a measure of the noise component in a second seismic trace signal for the second vibration point from the measure of the signal component in the first seismic trace signal for the second vibration point; and
(c) summing the measure of the signal component in the first seismic trace signal for the second vibration point with the measure of the noise component in the second seismic trace signal to form a normalized, stacked signal component for the second vibration point.

* * * * *